(12) United States Patent
Ferguson

(10) Patent No.: US 9,896,592 B2
(45) Date of Patent: Feb. 20, 2018

(54) TEMPORARY ELASTOMERIC FUNCTIONAL BARRIER MEMBRANE AND METHOD OF MANUFACTURE

(71) Applicant: Vernay Laboratories, Inc., Yellow Springs, OH (US)

(72) Inventor: Robert Ferguson, Newnan, GA (US)

(73) Assignee: VERNAY LABORATORIES, INC., Yellow Springs, OH (US)

(*) Notice: Subject to any disclaimer, the term of this patent is extended or adjusted under 35 U.S.C. 154(b) by 114 days.

(21) Appl. No.: 14/549,929

(22) Filed: Nov. 21, 2014

(65) Prior Publication Data
US 2016/0146359 A1    May 26, 2016

(51) Int. Cl.
| | |
|---|---|
| *F16K 15/14* | (2006.01) |
| *C09D 109/02* | (2006.01) |
| *C09D 123/16* | (2006.01) |
| *F16K 17/14* | (2006.01) |

(52) U.S. Cl.
CPC ......... *C09D 109/02* (2013.01); *C09D 123/16* (2013.01); *F16K 15/147* (2013.01); *F16K 15/148* (2013.01); *F16K 17/14* (2013.01); *Y10T 137/1789* (2015.04); *Y10T 137/789* (2015.04);
(Continued)

(58) Field of Classification Search
CPC ...... F16K 15/14; F16K 15/144; F16K 15/147; F16K 15/185; F16K 15/202; F16K 15/20; F16K 17/164; F16K 17/14; F16J 15/00; F16J 15/02; F16J 15/022; Y10T 137/789; Y10T 137/1744; Y10T 137/1699; Y10T 137/1789; Y10T 137/1632; Y10T 137/7882; Y10T 137/7883; B05B 11/0062; B05B 11/007; B05B 11/0008; B05B 1/044

USPC ....... 137/315.33, 68.21, 68.23, 68.27, 68.28, 137/70, 71, 601.03, 512.15, 512.4, 843, 137/854, 846, 847, 852; 222/153.06,
(Continued)

(56) References Cited

U.S. PATENT DOCUMENTS

| | | | | |
|---|---|---|---|---|
| 3,387,624 A | * | 6/1968 | Soucy | B65D 47/2037 |
| | | | | 137/847 |
| 4,279,717 A | * | 7/1981 | Eckberg | C08G 59/68 |
| | | | | 428/413 |

(Continued)

OTHER PUBLICATIONS

PCT, International Search Report and Written Opinion, PCT/US2015/061747 (dated Feb. 1, 2016).

*Primary Examiner* — Mary McManmon
*Assistant Examiner* — Hailey K Do
(74) *Attorney, Agent, or Firm* — Thompson Hine LLP

(57) ABSTRACT

A fluid check valve incorporating a temporary elastomeric functional barrier membrane, the check valve having a sealing member comprising a first elastomer and a barrier membrane comprising a second elastomer, different from the first elastomer, disposed directly upon the surface of the sealing member so as to form a continuous layer over at least a seal opening of the sealing member. The barrier membrane may include a photoinitiator and coagent which aids in the ultraviolet (UV) curing of the second elastomer after application upon the first. The barrier membrane may applied as a solution of monomers, photoinitiator, and optional coagent, the solvent evaporated, and the deposited solutes exposed to ultraviolet so as to form the barrier membrane material.

20 Claims, 4 Drawing Sheets

(52) U.S. Cl.
CPC .... *Y10T 137/7879* (2015.04); *Y10T 137/7882* (2015.04)

(58) Field of Classification Search
USPC .............. 222/153.05, 541.1–541.6; 251/368; 220/89.2; 239/533.13, 533.14, 602
See application file for complete search history.

(56) References Cited

U.S. PATENT DOCUMENTS

| | | | |
|---|---|---|---|
| 4,341,239 A * | 7/1982 | Atkinson | F16K 15/147 137/493 |
| 4,402,340 A * | 9/1983 | Lockwood, Jr. | F16K 1/305 137/322 |
| 5,237,971 A | 8/1993 | Worsley | |
| 5,587,244 A * | 12/1996 | Flinchbaugh | C09K 3/1018 277/944 |
| 6,053,194 A * | 4/2000 | Nelson | F16K 15/147 137/70 |
| 7,455,891 B2 * | 11/2008 | Kunz | B05D 3/067 427/223 |
| 7,458,388 B2 | 12/2008 | Huang | |
| 8,193,705 B2 * | 6/2012 | Manuela | H05B 33/04 313/503 |
| 8,622,082 B1 | 1/2014 | Roys | |
| 8,701,928 B2 * | 4/2014 | Samson | A47G 19/2272 137/843 |
| 2004/0039094 A1 * | 2/2004 | Taylor | C08F 290/14 524/261 |
| 2009/0014678 A1 | 1/2009 | Durham | |
| 2009/0219353 A1 * | 9/2009 | Price | B41J 2/17596 347/86 |
| 2009/0281250 A1 | 11/2009 | Desimone et al. | |
| 2010/0180971 A1 * | 7/2010 | Hatton | B60P 7/065 137/843 |
| 2014/0318653 A1 * | 10/2014 | Hoffman | B65D 77/225 137/855 |

* cited by examiner

200

210: Applying a solution comprising a solvent, an elastomer monomer, and a photoinitiator directly upon the surface of a sealing member and over at least a seal opening portion of the sealing member

220: Evaporating the solvent from the applied solution

Intermediate linking of elastomer monomer

230: Exposing the applied elastomer monomer and photoinitiator to an ultraviolet light source Ultimate linking of elastomer monomer

240: Linking forms a temporary elastomeric functional barrier membrane across the seal opening portion of the sealing member

Fig. 4

TEMPORARY ELASTOMERIC FUNCTIONAL BARRIER MEMBRANE AND METHOD OF MANUFACTURE

FIELD

The present disclosure is directed to fluid control valves and, more particularly, to self-sealing fluid check valves such as those used in fluid canisters and fluid cartridges for the supply of consumable fluids.

BACKGROUND

Self-sealing fluid check valves are used in a variety of applications, including, for example, cartridges providing consumable ink to ink jet printers. Such check valves come in various forms such as slit septum valves, duckbill valves, bidirectional valves, disc valves, umbrella valves, and the like. The check valve may be preloaded so as be "normally closed" and require a substantial pressure differential in order to open, or non-preloaded so as to be "normally open" and permit flow in response to essentially any positive pressure differential. Normally open check valves are typically directional check valves, with substantial negative pressure differentials causing the valve to close against continued flow. However, because some force is necessary to make and maintain a fluid-tight seal, low negative pressure differentials may permit a directional, normally open check valve to leak fluid at low flow rates.

Fluid canisters and cartridges having self-sealing fluid check valves may incorporate a barrier membrane or barrier laminate. Changes in relative pressurization due to changes in ambient pressure (pressure swings, particularly those occurring during air transport), rapid acceleration/deceleration during handling (impact stress caused by loading and unloading activities), and changes in relative pressurization due to changes in ambient temperature (temperature swings caused by storage or transport in non-climate controlled conditions) all can create sufficient pressure differentials to cause leakage through the fluid check valve. A barrier membrane or barrier laminate can initially seal the canister or cartridge to prevent the fluid contents from leaking due to the stresses involved in shipping, handling, and storage. Such a barrier can also prevent the fluid contents from becoming contaminated by other elements which might invade the canister or cartridge due to these same effects. However, such barriers are typically manufactured and applied separately from the fluid check valve upon the canister or cartridge, increasing the manufacturing cost. In some products, such barriers must also be manually removed by the end user, potentially requiring the user to locate and manipulate a structure such as a pull-tab in order to detach the barrier and expose the check valve. In other products, such barriers may be positioned behind a fluid check valve and pierced by a probe or needle positioned within a port of the receiving device. Yet that same probe or needle may damage and/or distort the fluid check valve, preventing it from functioning properly upon removal of the canister or cartridge from the receiving device.

SUMMARY

The applicant has developed a temporary elastomeric functional barrier membrane which may be formed in place upon a fluid check valve. The barrier membrane may be pre-formed over a sealing member of the fluid check valve prior to installation of the member within a valve body (such as over a slit septum seal or a duckbill seal in those respective valves) or post-formed over a sealing member and adjacent seat portion of a valve body (such as over a disk seal and seat or umbrella skirt and seat in those respective valve types) without requiring the use of complex mechanical devices to apply separately manufactured barrier elements to the member and valve. In preferred embodiments, the barrier membrane is formed directly upon conventional sealing member substrates, for instance thermoformed elastomers, rapidly and without exposing the substrate and/or completed valve to additional high temperature operations.

In a first aspect, the disclosure pertains to a fluid check valve having a sealing member comprised of a first elastomer and a barrier membrane comprised of a second elastomer, different from the first elastomer, disposed directly upon the surface of the sealing member so as to form a continuous layer over at least a seal opening portion of the sealing member. The barrier membrane includes a photoinitiator, such as an iodonium salt or benzophenone, which aids in the photodynamic curing of the second elastomer after application upon the first.

In a second aspect, the disclosure pertains to a method of manufacturing a temporary elastomeric functional barrier membrane upon a fluid check valve sealing member. The method includes the steps of (1) applying a solution comprising a solvent, an elastomer precursor, and a photoinitiator directly upon the surface of the sealing member and over at least a seal opening portion of the sealing member, (2) evaporating the solvent from the applied solution, and (3) exposing the applied elastomer precursor and photoinitiator to an ultraviolet light source to link the applied elastomer precursor and form a temporary elastomeric functional barrier membrane across the seal opening portion of the sealing member. The steps may be repeated, applying the solution directly upon successive layers of the deposited elastomer precursor or linked temporary elastomeric functional barrier membrane, to build up a barrier membrane with greater rupture resistance.

BRIEF DESCRIPTION OF THE DRAWINGS

FIG. 4 is a block diagram illustrating the steps involved in the method of manufacturing the temporary elastomeric functional barrier membrane.

DETAILED DESCRIPTION

As used herein, the term "a seal opening portion" shall be interpreted to mean those portions of a sealing member that are proximate to the sealing surfaces of the sealing member. The "sealing surfaces" shall be regarded those surfaces which mutually disengage from and engage with each other during opening and closing of the fluid check valve, or those surfaces which disengage from and engage with a seat in a valve body during opening and closing of the fluid check valve, in order to control the flow of fluid through the valve. It will be understood that at least the seal opening portion must be displaced in order to alter the closure state of the valve.

Figure 1:
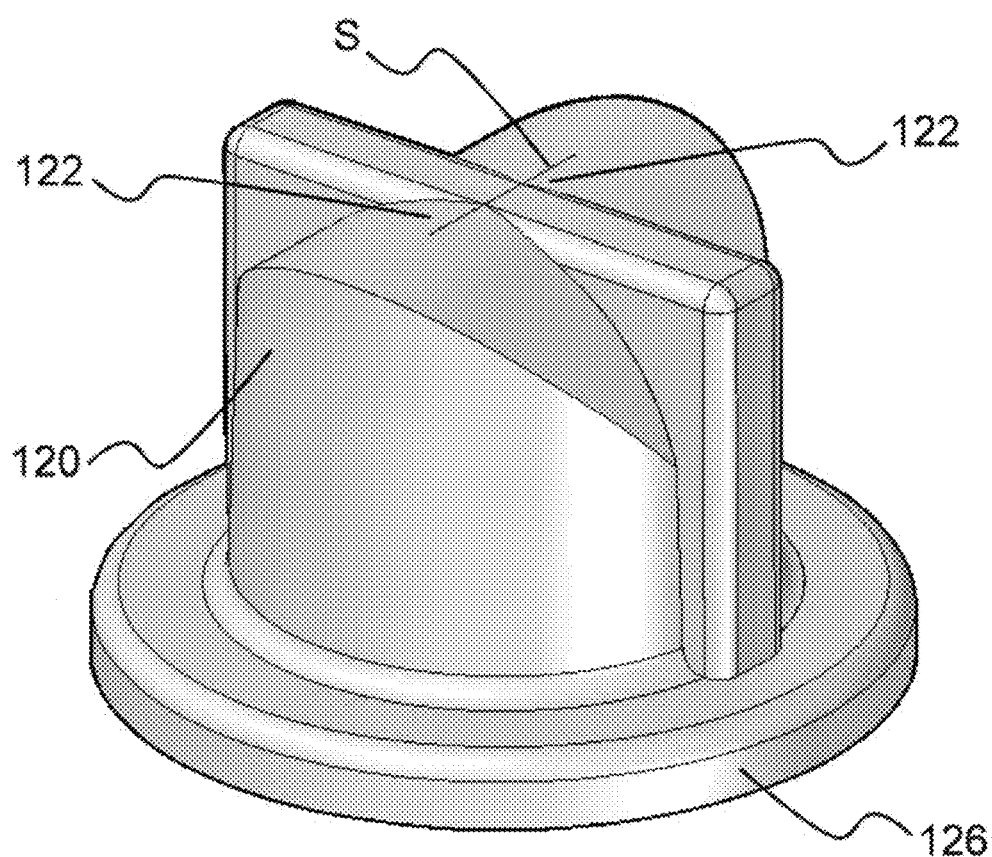
FIG. 1 is an isometric view of a normally closed, bidirectional fluid check valve sealing member in a closed configuration.
Figure 2:
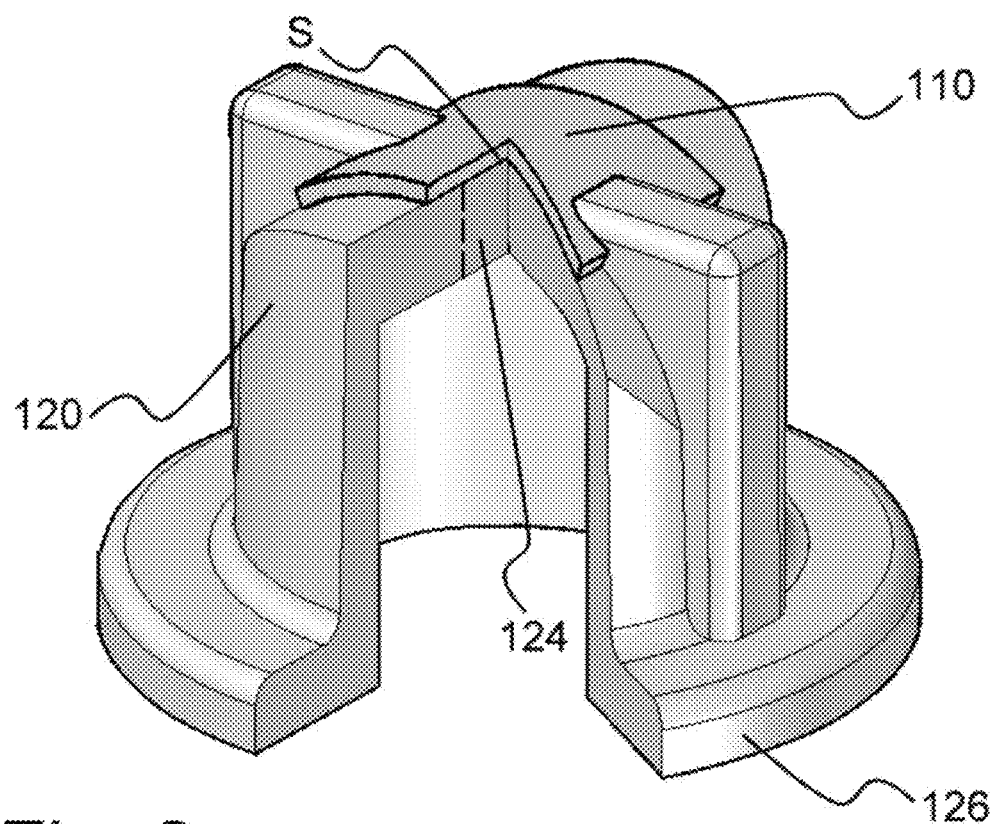
FIG. 2 is a sectional isometric view of the valve of FIG. 1, with a temporary elastomeric functional barrier membrane disposed directly upon the sealing member and across the seal opening portion of the member.

A first aspect of the disclosure is a fluid check valve 100 incorporating a temporary elastomeric functional barrier membrane 110. In one embodiment, shown in FIGS. 1 and 2, the fluid check valve 100 includes a sealing member 120 comprised of a first elastomer. For example, the first elastomer of the sealing member 120 may principally include VMQ (silicone rubber or polydimethylsiloxane). The functional barrier membrane 110 comprises a second elastomer, different from the first elastomer, which is disposed directly upon and adhered to the surface of the sealing member 120. The second elastomer may be selected so as to promote adhesion of the functional barrier membrane 110 the surface of the sealing member 120. For example, the second elastomer of the barrier membrane 110 may principally include an epoxy siloxane resin. Epoxy siloxanes resins have a good affinity for silicone rubber.

As illustrated, the functional barrier membrane 110 forms a continuous layer over at least a seal opening portion 122 (shown in FIG. 1) of the sealing member 120. For example, the sealing member 120 may be a bidirectional sealing member including a self-sealing slit S (best seen in FIG. 1). In the illustrated member, sealing surface 124 mutually disengages from and engages with a complementary sealing surface 124 (in the omitted section of the member) during opening and closing of the fluid check valve and, in the illustrated example, the self-sealing slit S. Thus, the functional barrier membrane 110, through adhesion to the seal opening portion 122, substantially prevents mutual disengagement of the sealing surfaces 124 until it is ruptured by an end user. Those of skill in the art will recognize that the sealing member 120 may form a complete fluid check valve 100 if appropriate portions of the sealing member 120, such as a flange portion 126, are bonded across or within a fluid aperture of a fluid canister or cartridge. On the other hand, the fluid check valve 100 may further include a valve body (not shown in FIGS. 1 and 2) configured to secure the sealing member 120 within the body. The valve body would subsequently be bonded and/or mechanically secured across or within a fluid aperture of a fluid canister or cartridge. For example, the valve body could be a snap-fit cap, a screw cap, or another cap structure configured to secure the flange portion 126 of the illustrated sealing member 120 between mutually opposing flange portions disposed about an internal fluid channel. The fluid channel and sealing member 120 could subsequently be placed in fluid communication with the fluid contents of a fluid canister or cartridge by securing the cap to a lip (a beaded lip to engage a snap-fit cap, a helically threaded lip to engage a screw cap, etc.) of the latter structure.

Figure 3:
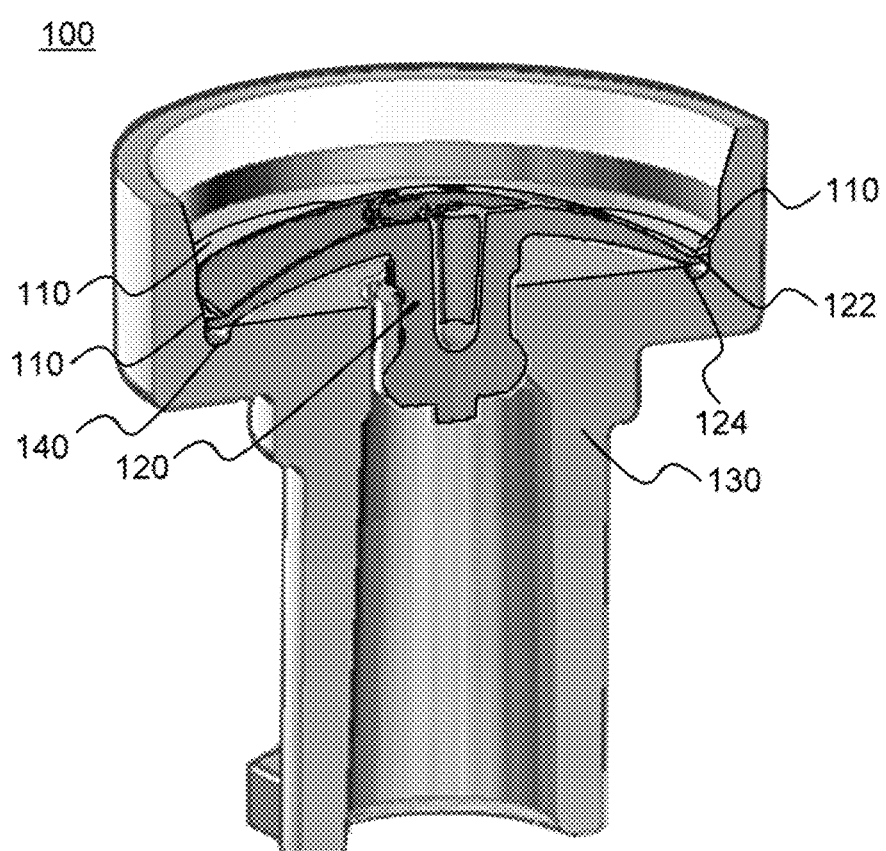
FIG. 3 is a sectional perspective view of a normally closed, umbrella-type fluid check valve with a temporary elastomeric functional barrier membrane disposed across the seal opening portion of the member from the umbrella skirt to the seat of the valve body.

In other embodiments, such as the one shown in FIG. 3, the fluid check valve 100 further includes a valve body 130 which defines a seat 140. Sealing member 120, again comprised of a first elastomer, releasably engages the seat 140 so as to alter the closure state of the valve 100. The functional barrier membrane 110 again comprises a second elastomer, different from the first elastomer, which is disposed directly upon and adhered to the surface of the sealing member 130. However, the functional barrier membrane 110 in such embodiments forms a continuous layer over both a seal opening portion 122 of the sealing member 120 and an adjoining portion of the seat 140. In the illustrated sealing member 120, sealing surface 124 disengages from and engages with an inner portion of seat 140 during opening and closing of the fluid check valve, displacing seal opening portion 122 with respect to an outer portion of the seat 140. Thus, the functional barrier membrane 110, through adhesion to both the seal opening portion 122 and the outer portion of the seat 140, substantially prevents disengagement of the sealing surface 124 from the inner portion of the seat 140 until it is ruptured by an end user.

For example, the applicant has determined that a 5 mil (0.005 inch) thick barrier membrane 110 comprised of epoxysiloxane is sufficient to increase the differential pressure required to open a 32 mil (¹⁄₃₂nd inch) thick, silicone rubber split septum valve from approximately 75 mBar+/−10 mBar to approximately 650 mBar, +/−200 mBar (ranging from 440 mBar to as much as 1000 mBar). Average forward flow through the valve after rupture of the barrier membrane 110 was virtually indistinguishable from flow through like, untreated valves.

A second aspect of the disclosure is a method 200 of manufacturing a temporary elastomeric functional barrier membrane 110 upon a fluid check valve sealing member 120. In general, the method 200 comprises the steps of:

(1) applying a solution comprising a solvent, an elastomer precursor, a photoinitiator (or catalyst), and coagent directly upon the surface of the sealing member 120 and over at least a seal opening portion 122 of the sealing member, 210;

(2) evaporating the solvent from the applied solution, 220; and (3) exposing the applied elastomer precursor, photoinitiator and coagent to an ultraviolet light source, 230.

Exposure to the ultraviolet light source causes the photoinitiator to release radicals and act as a catalyst. The radicals scavenge either hydrogen or oxygen protons within the solution components. This process is accelerated by the potential presence of a coagent, and the cross-linked elastomer monomer or monomers (in instances where the elastomer is a copolymer), once applied to the surface of the substrate and exposed to UV light, form a temporary elastomeric functional barrier membrane 110 across the seal opening portion 122 of the sealing member 120 (depicted as result 240). The solvent may be a volatile organic solvent such as hexane, toluene, methyl ethyl ketone (MEK), or the like. The photoinitiator (or catalyst) may be an iodonium salt, a benzophenone, a benzoamine, a thioxanthone, or a thioamine, and derivatives thereof. In one particular embodiment, the solvent is hexane, the elastomer precursor is an epoxy siloxane monomer at a concentration of 44-47% by weight, and the photoinitiator (or catalyst) is iodonium salt at a concentration of up to 2% by weight. In another embodiment, the solvent is hexane, the elastomer precursor is an EPDM terpolymer (comprised of three discrete monomers) at a concentration of 41-45% by weight, and the photoinitiator is benzophenone at a concentration of up to 2% by weight. In yet another embodiment, the solvent is MEK, the elastomer precursor is for a nitrile-butadiene rubber (acrylonitrile and butadiene monomers) at a concentration of 37-41% by weight, and the photoinitiator is benzophenone at a concentration of up to 2% by weight. In various embodiments, a cross-linking coagent, such as triallylisocyanurate (TAIC), may be included at a concentration of up to 1.5% by weight to further increase the rupture pressure of the membrane for a given thickness.

The solution may be applied and the solvent evaporated to create a barrier membrane 110 having a preselected thickness. In some embodiments, the solution may have sufficient viscosity for a single application to produce in the preselected thickness (after evaporation of the solvent and curing of the elastomer precursor). In other embodiments, the application and evaporation steps may be repeated to build up an applied elastomer precursor/photoinitiator layer to the preselected thickness (without serial curing of the elastomer precursor). In still other embodiments, the application, evaporation, and exposure steps may be repeated to build up a laminate barrier membrane 110 having the preselected thickness. Those of skill in the art will recognize that the layers of the laminate may be mutually bonded together by continued progression of the curing process within a previously applied layer and/or reinitiation of the curing process within a previously applied layer as a byproduct of conducting the exposure step upon a subsequently applied layer.

The temporary elastomeric functional barrier membrane 110 may be easily ruptured by a needle insertion device, a projecting probe fixed within a canister receptacle or cartridge slot, or even a manual probe manipulated against the sealing member by the end user. The functional barrier membrane 110 may be also be ruptured by applying a positive or negative pressure differential across the sealing member 130 that is greater than the ultimate strength of the barrier membrane. Thus, the functional barrier membrane 110 may be used as a temporary seal for leak prevention during initial shipping and handling and/or as a protective seal to ensure isolation of the fluid content of a fluid canister or cartridge prior to use.

The various aspects and implementations described above are intended to be illustrative in nature, and are not intended to limit the scope of the invention. Any limitations to the invention will appear in the claims as allowed.

What is claimed is:

1. A fluid check valve comprising:
a sealing member comprising a first elastomer; and
a barrier membrane comprising a second elastomer, different from the first elastomer, the second elastomer being disposed directly upon and self-adhered to a surface of the sealing member so as to form a continuous layer over at least a seal opening portion of the sealing member that must be ruptured for opening of the seal opening portion of the sealing member.

2. The fluid check valve of claim 1, wherein the first elastomer principally includes a silicone rubber.

3. The fluid check valve of claim 2, wherein the second elastomer principally includes a cured epoxy siloxane resin.

4. The fluid check valve of claim 3, wherein the second elastomer further includes a photoinitiator compound.

5. The fluid check valve of claim 4, wherein the photoinitiator compound is an idonium salt.

6. The fluid check valve of claim 4, wherein the photoinitiator compound is a benzophenone, a benzoamine, a thioxanthone, a thioamine, or a derivative thereof.

7. The fluid check valve of claim 1, wherein the valve further comprises a valve body, and the barrier membrane forms a continuous layer over both the seal opening portion of the sealing member and an adjoining portion of a valve seat.

8. The fluid check valve of claim 7, wherein the second elastomer principally includes a cured epoxy siloxane resin.

9. The fluid check valve of claim 8, wherein the second elastomer further includes a photoinitiator compound.

10. The fluid check valve of claim 9, wherein the photoinitiator compound is an iodonium salt.

11. The fluid check valve of claim 9, wherein the photoinitiator compound is benzophenone, a benzoamine, a thioxanthone, a thioamine, or a derivative thereof.

12. A method of manufacturing a temporary elastomeric functional barrier membrane upon a fluid check valve sealing member, the method comprising the steps of:
(1) applying a solution directly upon a surface of the fluid check valve sealing member and over at least a seal opening portion of the fluid check valve sealing member, the solution comprising a solvent, an elastomer precursor, a photoinitiator, and, optionally, a coagent;
(2) evaporating the solvent from the applied solution; and
(3) exposing the applied elastomer precursor, photoinitiator and any optional coagent to an ultraviolet light source;
wherein the exposing step links the applied elastomer precursor and forms a temporary elastomeric functional barrier membrane across the seal opening portion of the sealing member.

13. The method of claim 12, wherein the applying and evaporating steps are repeated prior to the exposure step.

14. The method of claim 12, wherein the applying, evaporating, and exposing steps are repeated to create a laminate temporary elastomeric functional barrier membrane having a preselected thickness.

15. The method of claim 12, wherein the elastomer precursor comprises an epoxy siloxane monomer or monomers, and the photoinitiator is an iodonium salt.

16. The method of claim 12, wherein the elastomer precursor comprises an epoxy siloxane monomer or monomers, and the photoinitiator is benzophenone, a benzoamine, a thioxanthone, a thioamine, or a derivative thereof.

17. The method of claim 12, wherein the elastomer precursor comprises an EPDM monomer or monomers, the photoinitiator is an iodonium salt, and the optional coagent is present and is triallylisocyanurate (TAIC).

18. The method of claim 12, wherein the elastomer precursor comprises an EPDM monomer or monomers, the photoinitiator is benzophenone, and the optional coagent is present and is triallylisocyanurate (TAIC).

19. The method of claim 12, wherein the elastomer precursor comprises acrylonitrile and butadiene, the photoinitiator is iodonium salt, and the optional coagent is present and is triallylisocyanurate (TAIC).

20. The method of claim 12, wherein the elastomer precursor comprises acrylonitrile and butadiene, the photoinitiator is benzophenone, and the optional coagent is present and is triallylisocyanurate (TAIC).

* * * * *